March 10, 1942. H. C. GRANT, JR Re. 22,047

SMOKE ACCUMULATOR FOR FIRE DETECTING SYSTEMS

Original Filed Feb. 10, 1939

INVENTOR.
Harry C. Grant, Jr.
BY J. William Carson
ATTORNEY.

Reissued Mar. 10, 1942

Re. 22,047

UNITED STATES PATENT OFFICE 22,047

SMOKE ACCUMULATOR FOR FIRE DETECTING SYSTEMS

Harry C. Grant, Jr., New York, N. Y., assignor to Specialties Development Corporation, Bloomfield, N. J., a corporation of New Jersey Original No. 2,232,225, dated February 18, 1941, Serial No. 255,607, February 10, 1939. Application for reissue February 25, 1941, Serial No. 380,518

9 Claims. (Cl. 98—115)

This invention broadly relates to the detection of fire, and more specifically to fire detecting systems of the type disclosed by Letters Patent of the United States Nos. 1,343,911 and 2,033,466. In systems of this type, particularly as employed on board ship, fire detection is based largely upon smoke detection; that is, smoke is used as an indicator of the presence of fire. In connection therewith, air under suspicion is collected by means of suction from each of a number of supervised compartments through so-called detector pipes having intake heads, extending into the individual compartments, generally running along the ceiling of such compartments and leading therefrom to a central smoke observation or detecting chamber, where the presence of smoke in the air-stream passing through is observable, and where, if desired, fire extinguishing measures may be initiated upon the passage of smoke by any one of a number of known devices, the details of which have no bearing on the present invention.

In connection with a system of this nature, it is very important that air to be thus examined should be representative and be gathered in by the detector pipes as fast and as efficiently as possible, and it is more particularly with this aspect of fire detecting that the invention is here concerned.

It is common, in the case of smoke gathering devices of the type referred to, to use downwardly directed lamp-shade type air suction intakes, which are attached to the intake ends of the detector pipes adjacent the ceiling of the respective compartments, as shown in Letters Patent of the United States No. 1,343,911. This arrangement, however, while satisfactory in a general way, does not take into account the fact that, for instance, in case of slow fires, warm air causes smoke to rise and accumulate in the form of a layer along the ceiling of the compartment in question, delaying the drawing in of a representative sample of air until such a smoke layer has acquired a thickness sufficient to extend down from the ceiling to the intake edge of the smoke accumulator, specifically as shown in Figures 2 and 3 of Letters Patent of the United States No. 1,343,911. This arrangement will cause the proper indication of fire by the presence of smoke only after a considerable delay and not until the fire has gained headway. Furthermore, in accordance with modern practice, the individual compartment detector pipes are usually subjected to suction through the observation chamber only intermittently, as their generally large number precludes a separate smoke detecting chamber for each pipe, or simultaneous observation of all the compartments, because of impracticability of such a procedure, the method usually employed being to submit each compartment to the effect of suction via the detecting chamber in rotation so as to be able to observe each compartment separately, such method having been disclosed in Letters Patent of the United States No. 2,033,466. It will be seen therefore that the period allowed for a sample of air to be gathered, conducted through the detecting chamber, there observed, and, if desired, made to initiate a fire alarm or the like, is necessarily limited.

To eliminate this lag in smoke detection, and to speed up and improve the sucking action on the suspected air, the present air suction intake or smoke accumulator has been designed. This accumulator provides a structure which will effect a more concentrated and speedier suction at the intake of the detector pipe, especially of air close to the ceiling of the spaces under supervision.

It is, accordingly, an object of this invention to provide a smoke accumulator or sample air intake for air suction pipes of a smoke detecting system that will draw in samples of air from points as close to the ceiling as possible.

Another object of the present invention is to provide a smoke accumulator that will exert a highly concentrated sucking action upon the air surrounding the intake in an area of a relatively large radius.

A still further object is to provide a suction intake device of the type referred to, which will be effective radially with respect to the end of the intake pipe and in a plane of relatively small section parallel with and immediately adjacent to the ceiling of the space being supervised.

Other objects and advantages of the invention will become apparent as the more detailed description of the invention is presented.

Attention is now called to the accompanying drawing which illustrates the invention and forms a part of the specification.

Figure 1:
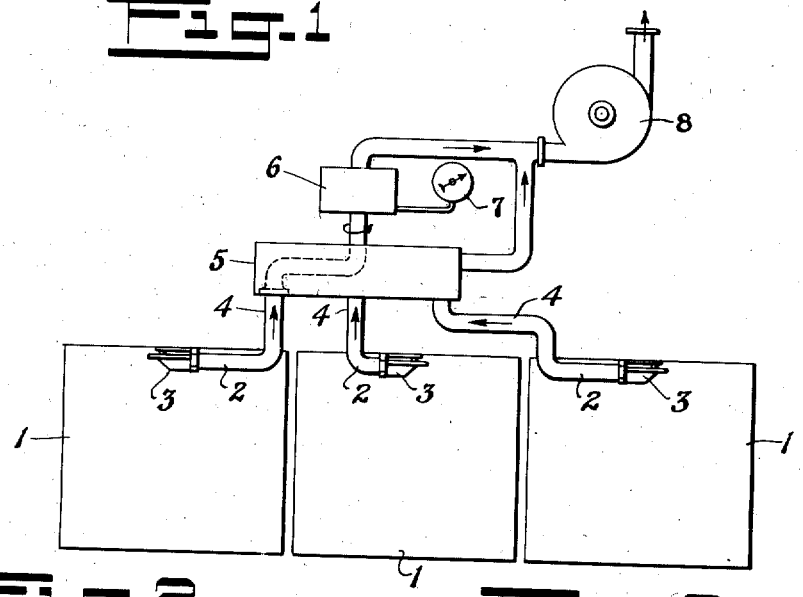
Figure 1 is a diagrammatic view illustrating a smoke detecting system for supervising three compartments, to which the present invention may be applied.

Referring to the drawing, it will be seen in Figure 1 that the smoke detecting system, depicted therein, comprises the compartments to be supervised 1, individual compartment detector pipes 2, to which are secured smoke accumulators 3, and whence the gathered air is conducted via pipes 4 to a selector 5, by means of which each compartment in turn is subjected to the suction effect of an air pump 8, acting through a detection chamber 6, which is equipped with a smoke indicator 7. For details of a representative type of selector, reference is made to Letters Patent of the United States No. 2,033,466, mentioned above.

Figure 2:
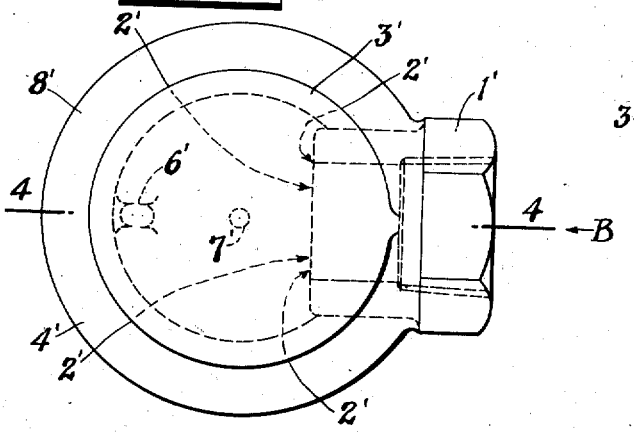
Figure 2 is a top plan view of an accumulator, illustrating an embodiment of the present invention.
Figure 3:
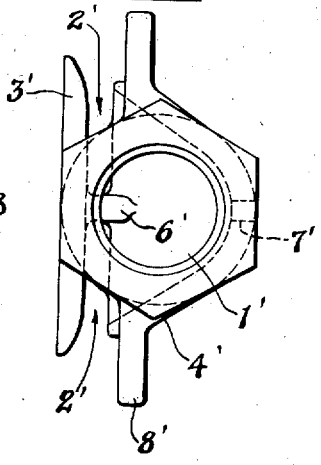
Figure 3 is a side elevational view of the accumulator as seen when viewed in the direction of the arrow B, indicated in Figure 2.
Figure 4:
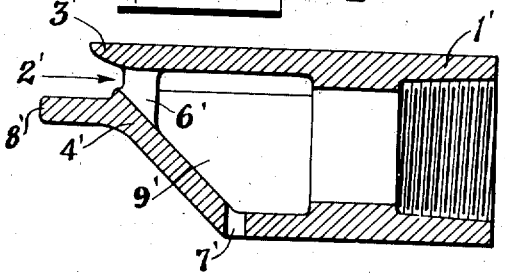
Figure 4 is a sectional view of the accumulator, taken on the line 4—4 of Figure 2.

In Figures 2, 3 and 4, where like numerals refer to like elements, 1′ is a hexagonally formed and interiorly threaded tubular coupling means adapted to be connected to a suction conduit (not shown), while 3′ represents a flat circular top member and 4′ a trough-like and substantially hemispherical bottom member merging with the coupling means 1′, and forming a suction chamber 9′ with the top member 3′. These members are interconnected by means of a web 6′, and a bore 7′ provides drainage for any condensate that may have been precipitated in the chamber of the device as a consequence of drawing in moisture-laden air. At 8′ is shown a lip-like formation circumferential to the lower or bottom member 4′, parallel to and extending beyond the upper or top member 3′, and forming therewith a sort of air suction guide or intake indicated by arrows 2′, which is also effective in preventing the air intake space between the upper and lower members from being clogged by paint, a very real problem aboard ship.

In operation, the detector pipe is screwed into the coupling 1′ of the accumulator, and is mounted close to the compartment ceiling so as to permit the top member 3′ to lie flush against the ceiling. As soon as the particular pipe is subjected to suction through the selective suction device 5 (Figure 1), air is immediately drawn into the suction chamber 9′ from all sides of the accumulator as shown by arrows 2′ (Figure 2), and thence into the pipe through the coupling means. The peculiar construction of the peripherally tapering top member, and the flared annular lip on the lower member acting as an air stream guide, enables the smoke accumulator to exert a sucking action on a representative layer of air next to the ceiling, and allows a concentrated and strong intake action in an almost complete and relatively wide circle with its center substantially within the intake device, and in a plane of small section defined by the upper member 3′ and circumferential lip formation 8′.

It may be well to point out that it is contemplated, similarly to the system disclosed in Letters Patent of the United States No. 1,343,911, that the suction intake device of the present invention may be used to distribute fire extinguishing medium, if, as frequently provided for, an indication of smoke is followed by connection of the suction pipe, from which smoke was drawn, to a source of fire extinguishing medium, when the pipe and the intake head in question serve as distribution means for the medium. The fire extinguishing medium generally used is steam, or, as preferred in modern practice, carbonic acid.

From the foregoing description, it will be seen that I have provided a quickly and positively effective means for permitting air to be sucked into a suction conduit in a desired plane. It will be seen further that my invention accomplishes the various objects pointed out at the beginning of this specification.

While my invention has been illustrated and described with specific reference to the accompanying drawing, it will be apparent to those skilled in the art that the invention resides in certain principles of construction which may be embodied in various other forms without departing in any manner from the spirit and scope of the invention, and I therefore do not wish to be limited to the specific disclosure, but rather to the scope of the appended claims.

I claim:

1. A fluid medium suction intake device, comprising a body formed with a passage and adapted to be coupled to a fluid medium suction conduit secured adjacent to a flat surface, a circular cover member on said body adapted to lie flat against the said surface adjacent said conduit, and a circular trough-like second member on the body underlying the first member and spaced from said cover member in one plane along its largest circumference, having along said circumference a fluid medium guiding projection parallel to the first member and of a larger diameter than said first named member.

2. A fluid medium suction intake device, comprising a body formed with a passage and adapted to be coupled to a fluid medium suction conduit secured adjacent to a flat surface, a circular cover member on said body adapted to lie flat against the said surface adjacent said conduit, a circular trough-like second member on the body underlying the first member and spaced from said cover member in one plane along its largest circumference having along said circumference a lip-like fluid medium guiding projection parallel to the first member and of a larger diameter than said first named member, and a supporting web between the members.

3. A fluid medium suction intake device adapted to draw in a fluid medium from a region lying close to a structural surface, comprising a substantially tubular body member providing a fluid conducting passage, said body member having a wall substantially closing one end thereof, said body member being cut away along a substantially horizontal plane above its longitudinal axis from the closed end thereof for a predetermined distance along its length providing an opening which merges with the passage, said body member being shaped so as to give the opening a substantially continuous perimeter, a flow guiding portion overlying the opening, and means for supporting said guiding portion on said body member in spaced relation thereto.

4. A fluid medium suction intake device adapted to draw in a fluid medium from a region lying close to a structural surface, comprising a substantially semi-circular tubular body member providing a fluid conducting passage, said body member having an upwardly curved wall substantially closing one end thereof, said body member being cut away along a substantially horizontal plane above its longitudinal axis from the closed end thereof for a predetermined distance along its length providing an opening which merges with the passage; said body member being shaped so as to give the opening a substantially continuous circular periphery, a substantially circular flow guiding portion overlying the opening, said guiding portion having a substantially flat outer surface adapted to lie flush against a flat surface, and web means for supporting said guiding portion on said body member in spaced relation thereto.

5. A fluid medium suction intake device adapted to draw in a fluid medium from a region lying close to a structural surface, comprising a substantially tubular body member providing a fluid conducting passage, said body member having a wall substantially closing one end thereof, said body member being cut away along a substantially horizontal plane above its longitudinal axis from the closed end thereof for a predetermined distance along its length providing an opening which merges with the passage; said body member being shaped so as to give the opening a substantially continuous perimeter, a flange on said body member extending outwardly from the opening, a flow guiding portion overlying the opening and partly overlying said flange, and means for supporting said guiding portion on said body member in spaced relation thereto.

6. A fluid medium suction intake device adapted to draw in a fluid medium from a region lying close to a structural surface, comprising a substantially tubular body member providing a fluid conducting passage, said body member having a wall substantially closing one end thereof, said body member being cut away along a substantially horizontal plane above its longitudinal axis from the closed end thereof for a predetermined distance along its length providing an opening which merges with the passage; said body member being shaped so as to give the opening a substantially continuous perimeter, a flow guiding portion overlying the opening, and means for supporting said guiding portion on said body member in spaced relation thereto, said body member having an aperture in the bottom thereof.

7. A fluid medium suction intake device adapted to draw in a fluid medium from a region lying close to a structural surface, comprising a substantially tubular body member providing a fluid conducting passage, said body member having a wall substantially closing one end thereof, said body member being cut away along a substantially horizontal plane above its longitudinal axis from the closed end thereof for a predetermined distance along its length providing an opening which merges with the passage; said body member being shaped so as to give the opening a substantially continuous perimeter, a flange on said body member extending outwardly from the opening, a flow guiding portion overlying the opening and partly overlying said flange, and means for supporting said guiding portion on said body member in spaced relation thereto, said body member having an aperture in the bottom thereof.

8. A fluid medium suction intake device adapted to draw in a fluid medium from a region lying close to a structural surface, comprising a substantially semi-circular tubular body member providing a fluid conducting passage, said body member having an upwardly curved wall substantially closing one end thereof, said body member being cut away along a substantially horizontal plane above its longitudinal axis from the closed end thereof for a predetermined distance along its length providing an opening which merges with the passage; said body member being shaped so as to give the opening a substantially continuous circular periphery, a substantially circular flow guiding portion overlying the opening, said guiding portion having a substantially flat outer surface adapted to lie flush against a flat surface, and web means for supporting said guiding portion on said body member in spaced relation thereto, said body member having an aperture in the bottom thereof.

9. A fluid medium suction intake device adapted to draw in a fluid medium from a region lying close to a structural surface, comprising a substantially semi-circular tubular body member providing a fluid conducting passage, said body member having an upwardly curved wall substantially closing one end thereof, said body member being cut away along a substantially horizontal plane above its longitudinal axis from the closed end thereof for a predetermined distance along its length providing an opening which merges with the passage; said body member being shaped so as to give the opening a substantially continuous circular periphery, a substantially circular flange on said body member extending outwardly from the opening, a flow guiding portion overlying the opening and partly overlying said flange, said guiding portion having a substantially flat outer surface adapted to lie flush against a flat surface, and means for supporting said guiding portion on said body member in spaced relation thereto, said body member having an aperture in the bottom thereof beneath said guiding portion.

HARRY C. GRANT, JR.